United States Patent
Kettunen et al.

(10) Patent No.: US 6,705,529 B1
(45) Date of Patent: Mar. 16, 2004

(54) DATA CARD HOLDER AND READER THEREFOR

(75) Inventors: Mikko Kettunen, Ulm (DE); Ulrich Buschmann, Elchingen (DE)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/448,736

(22) Filed: Nov. 24, 1999

(30) Foreign Application Priority Data

Nov. 26, 1998 (GB) ................................................ 9825937
Oct. 29, 1999 (GB) ................................................ 9925675

(51) Int. Cl.[7] ............................................... G06K 7/00
(52) U.S. Cl. ....................... 235/486; 235/475; 235/483; 235/479; 235/485; 235/492
(58) Field of Search ................................. 235/486, 441, 235/492, 379, 383, 475, 485, 403, 479; 361/737; 439/218; 901/30

(56) References Cited

U.S. PATENT DOCUMENTS

| | | | | |
|---|---|---|---|---|
| 3,859,508 A | * | 1/1975 | Brosow et al. ................. 221/2 |
| 5,396,617 A | * | 3/1995 | Villwock et al. .............. 710/62 |
| 5,490,791 A | * | 2/1996 | Yamada et al. .............. 361/684 |
| 5,563,400 A | * | 10/1996 | Le Roux ...................... 235/486 |
| 5,591,047 A | * | 1/1997 | Yamada et al. .......... 439/541.5 |
| 5,608,606 A | * | 3/1997 | Blaney ........................ 361/686 |
| 5,625,534 A | * | 4/1997 | Okaya et al. ................ 361/686 |
| 5,661,635 A | * | 8/1997 | Huffman et al. ............ 345/901 |
| 5,739,516 A | * | 4/1998 | Bricaud ....................... 235/441 |
| 5,812,377 A | * | 9/1998 | Golbach ...................... 361/759 |
| 5,877,488 A | * | 3/1999 | Klatt et al. .................. 235/486 |
| 5,915,226 A | * | 6/1999 | Martineau ................. 379/114.2 |
| 5,929,427 A | * | 7/1999 | Harada et al. .............. 235/492 |
| 5,933,328 A | * | 8/1999 | Wallace et al. ............. 257/678 |
| 6,050,492 A | * | 4/2000 | Hoolhorst .................... 235/475 |
| 6,062,887 A | * | 5/2000 | Schuster et al. ............ 439/218 |
| 6,065,680 A | * | 5/2000 | Choi ........................... 235/475 |
| 6,097,605 A | * | 8/2000 | Klatt et al. .................. 361/737 |
| 6,097,606 A | * | 8/2000 | Groves et al. .............. 235/118 |
| 6,241,557 B1 | * | 6/2001 | Reichardt .................... 439/637 |
| 6,250,965 B1 | * | 6/2001 | Neifer ......................... 439/630 |
| 6,293,464 B1 | * | 9/2001 | Smalley, Jr. ................ 235/435 |
| 6,341,069 B1 | * | 1/2002 | Torlotin ...................... 361/737 |
| 6,381,142 B1 | * | 4/2002 | Hasegawa ................... 361/737 |
| 6,442,038 B1 | * | 8/2002 | Erickson et al. ............ 361/759 |
| 6,470,237 B2 | * | 10/2002 | Fujita et al. ................ 700/248 |
| 6,525,932 B1 | * | 2/2003 | Ohnishi et al. ............. 361/686 |

FOREIGN PATENT DOCUMENTS

| | | | |
|---|---|---|---|
| DE | 19624079 C1 | 1/1998 | |
| EP | 0715271 A2 | 6/1996 | |
| EP | 0 793 203 A 2 | 9/1997 | |
| GB | 2 299 192 | 9/1996 | |
| GB | 2299192 A | * 9/1996 | ............ G06K/7/01 |
| GB | 2 323 953 | 10/1998 | |

* cited by examiner

*Primary Examiner*—Karl D. Frech
*Assistant Examiner*—Daniel Walsh
(74) *Attorney, Agent, or Firm*—Perman & Green, LLP

(57) ABSTRACT

A holder and reader for two or more data cards for a radio communication device, the holder including a body having formations for releasably carrying the two or more data cards and being adapted to be removably installed in the data card reader of the device.

17 Claims, 16 Drawing Sheets

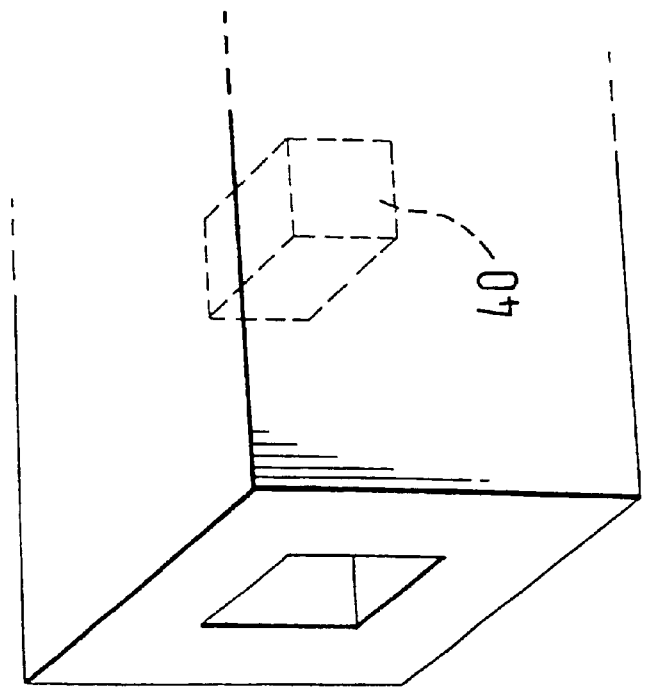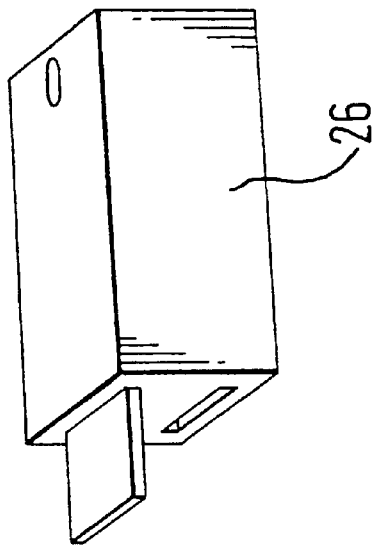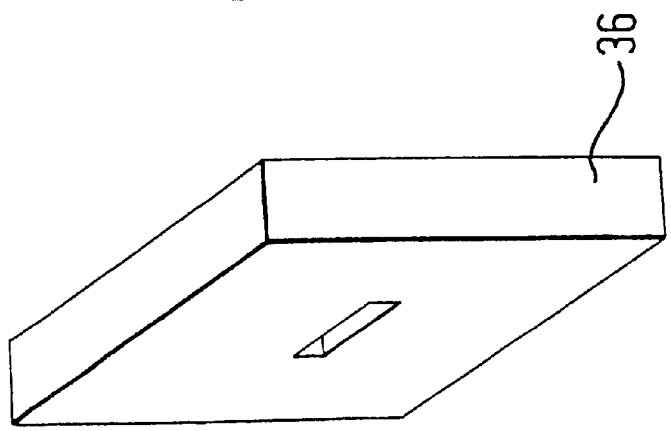
FIG. 3

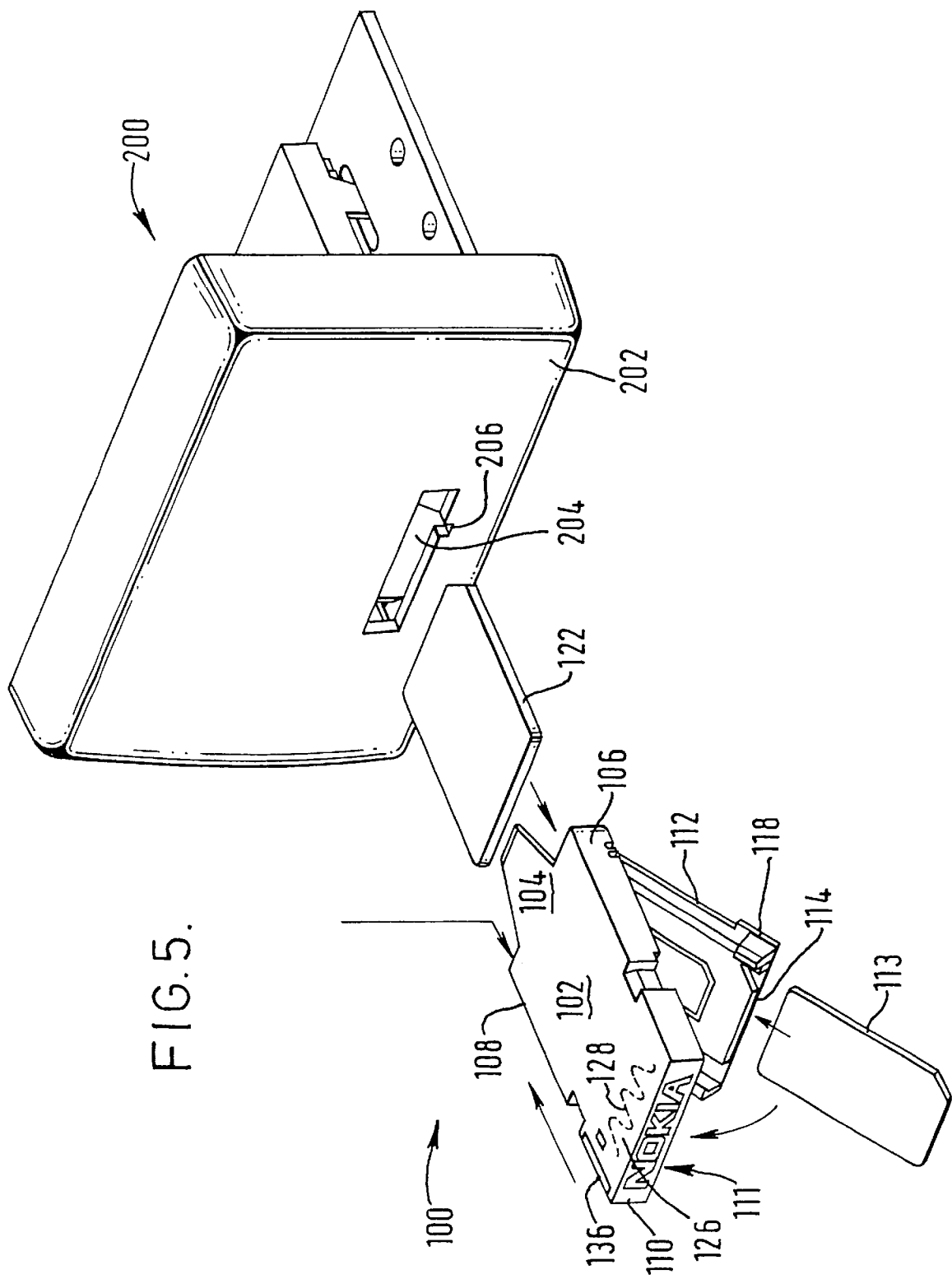

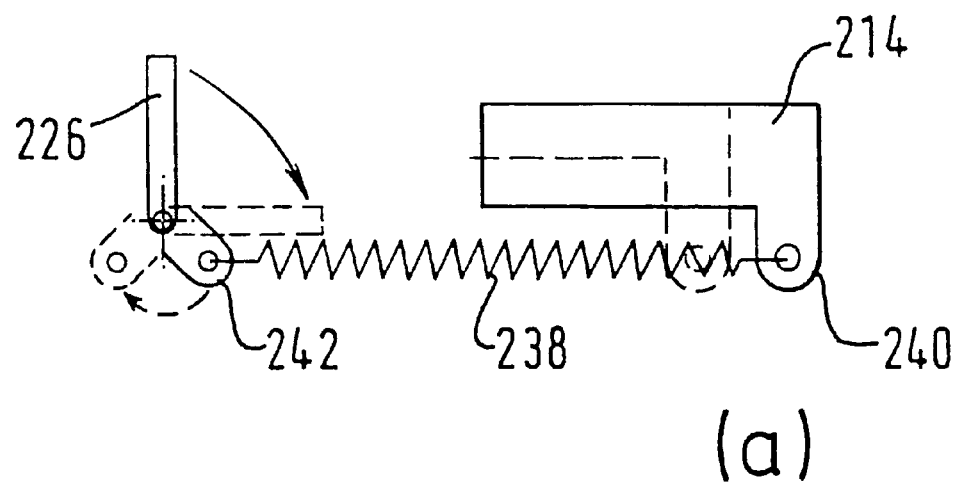
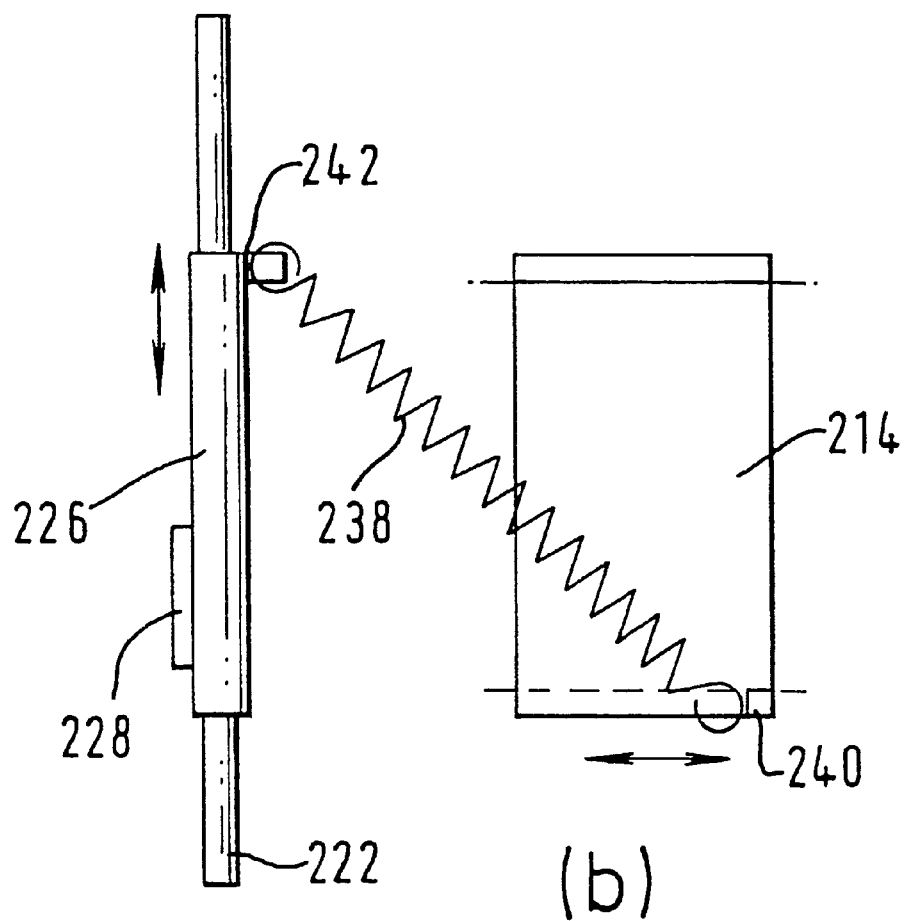
FIG. 10.

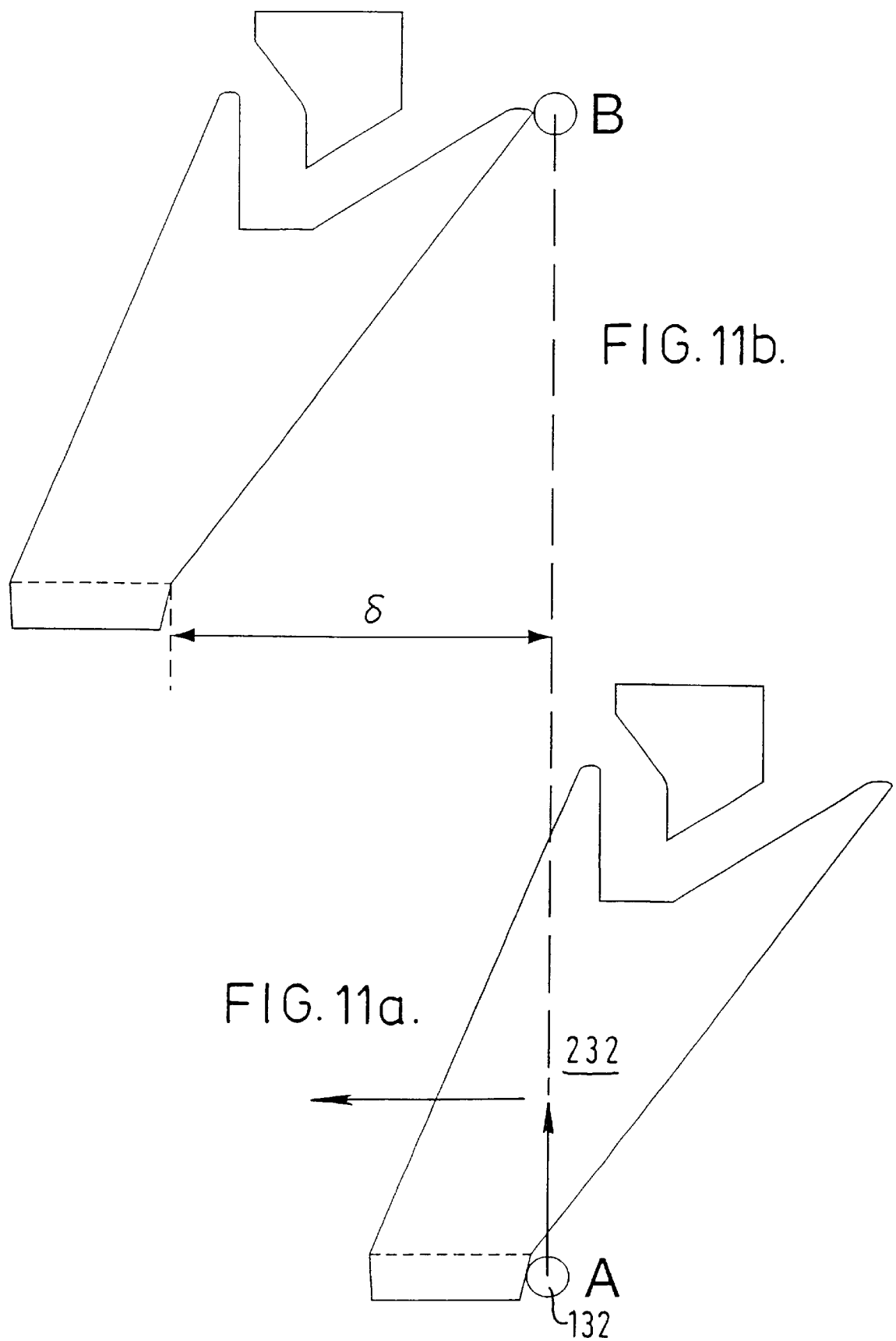

DATA CARD HOLDER AND READER THEREFOR

BACKGROUND OF THE INVENTION

The present invention relates to a holder for a data card and to a reader for reading/writing data from/to the data card. In particular, the present invention relates to a holder for a data card such as a subscriber identity module (SIM) which is designed to be used in conjunction with a reader of a radio communication device for wireless communication with a radio network.

Data cards take various forms and those used, for example, in cellular devices, may include passive memory cards (i.e. essentially a ROM), or an active processor card (i.e. capable of processing information internally within the card). An example of the latter is a smart card, which has a memory implemented as an integrated circuit in which information is stored. A smart card used extensively in GSM is the subscriber identity module (SIM). GSM specification 11.11 details the structure and functionality of SIM cards, but briefly a SIM card is a user removable module providing storage of subscriber related information. Notably, a SIM contains data fixed during the administration phase (e.g. the International Mobile Subscriber Identity (IMSI) which unambiguously identifies a subscriber; a personal identification number (PIN) to provide protection against unauthorised use), temporary network data (e.g. LAI location area information) and service related data (e.g. language preference, advice of charge). In the proposed Universal Mobile Telecommunications System (UMTS) standard, it is intended to have a User Service Identity Module (USIM) which is an application residing on the IC Card used for accessing UMTS services of a certain Service Provider and much like GSM SIMs shall contain sufficient information to identify the user and the Service Provider.

In GSM 11.11, two types of SIM cards are specified. The functionality of the SIM is the same for each, it is principally that the physical dimensions are different. One is a credit card size SIM, and the other is a plug in SIM about 15 mm by 20 mm. The rationale behind the different sizes is that the credit card size is perceived as a convenient size for the user from a practical standpoint. The plug-in SIM is intended to be semi-permanently installed in the cellular telephone. For example, in ordinary use, the SIM card could be located and used in a portable radio telephone handset; when the user is planning to travel in his car the SIM card can be removed from the handset and inserted into the radio telephone in the car.

Often cited problems with swapping the SIM card between different radio communication devices include the inconvenience and the length of time it takes to do so, and also the inherent 'fiddle-factor', i.e. awkwardness of having to manipulate the SIM so as to place it in the SIM reader. Such problems are compounded when a number of SIM cards are to be loaded/unloaded.

Against this background, an aspect of the present invention resides in a holder for two or more data cards for a radio communication device, the holder comprising a body having formations for releasably carrying said two or more data cards and being adapted to be removably installed in a data card reader of said device.

SUMMARY OF THE INVENTION

In accordance with this aspect of the invention, two or more data cards can be readily loaded in the holder and the holder easily installed in the data reader.

This not only avoids the need for a large number of mechanical parts associated with the data reader, but loading/unloading of the data cards is remote from the data card reader and is thus less awkward.

In a first embodiment, said formations are provided such that the two or more data cards when loaded in the body are carried in an oppositely facing back to back arrangement. Thus providing for economy of space.

Preferably, said formations are provided in said body by longitudinally extending slots for receiving said two or more data cards, and the body accordingly may include respective apertures for exposing electrical contacts of said data cards when loaded in the body.

In a second aspect, the present invention provides a radio communication device including a data card reader, the device having a housing defining an aperture associated with the reader and dimensioned to receive a data card holder carrying two or more data cards, the arrangement being such that the data card holder is removable from the reader, and wherein the data card holder is provided with formations for releasably carrying two or more data cards.

In one arrangement, the data card holder carries said two or more data cards in an oppositely facing arrangement, and the data card reader comprises two or more electrical circuits correspondingly arranged in facing relationship for reading the two or more data cards. In another arrangement, the data card holder carries said two or more data cards in a similarly facing arrangement, and the data card reader comprises one electrical circuit for reading the two or more data cards.

Optionally, the radio communication device comprises a cover member adapted to be disposed against said housing such that when a data card holder is located in the card reader the cover obstructs retraction of at least one of the two or more data cards.

Accordingly, two or more data cards can be loaded in the data reader and the cover plate, in a first position, covers one of the cards in the data card reader (or for example two of the cards if the reader contains three data cards) whilst permitting withdrawal of the other data card(s). With the cover member in a second position the data card(s) which were shut off in the first position can be withdrawn from the reader. In terms of the reverse operation of loading the data reader, the cover member in the first position allows uninhibited insertion of one or more data cards into the reader, and in the second position allows insertion of further data cards into the reader into card spaces/areas which were previously blocked by the cover member.

In this way, data cards which are temporarily installed in the reader on a frequent basis can be quickly and easily loaded and unloaded from the reader, and data cards which are to be stored on a relatively more permanent basis (but still requiring loading/unloading albeit infrequently) in the reader can be taken out by simply releasing the cover member from the housing.

Suitably, the cover member is provided with an aperture which when the cover member is disposed in the first position is in alignment with said second data card, thereby allowing retraction thereof. The aperture may be slot in registration with a corresponding slot in the reader having loaded therein the data card.

Conveniently, the data card holder is provided with longitudinally extending slots for receiving said two or more data cards, and the cover member is provided with one or more slots which when the cover member is disposed against said housing are in alignment with one or more of the openings of the longitudinally extending slots of the data card holder.

Advantageously, the radio communication device comprises ejector means arranged to urge the installed data card holder such that on removal of the cover member at least a portion of the data card holder is urged to project through the aperture.

Alternatively, the data card holder and reader are provided with a latching mechanism therebetween that allows the data card holder to be pressed into the reader for connection and then pressed in again for disconnection. This consequently eliminates the need for a separate ejector button and associated componentry to release the holder from the reader. The latching releasably connecting together the holder and reader, the holder having a longitudinal axis indicative of a longitudinal direction and being adapted to be received in the reader, and the latching mechanism being engagable in a latched condition connecting together the holder and reader by pressing the holder in the longitudinal direction into the reader, and being disengagable from the latched condition to release the holder and reader by pressing the holder into the reader in the longitudinal direction, the latching mechanism comprising

- a first element having a lateral deflecting surface and detent and being associated with one of the holder or the reader, the lateral deflecting surface being inclined to the longitudinal axis,
- a second element associated with the other of the holder or reader, and
- resilient means operative on pressing the holder into the reader to urge the holder and reader longitudinally apart, and to effect relative bias in a transverse direction to the longitudinal direction between the first element and the second element, such that on pressing the holder into the reader for connection, the first and second elements and the resilient means cooperate so as to engage the second element with the detent in the latched condition,
- and on pressing the holder into the reader for release, the first element disengages from the detent and the resilient means operates to urge at least a portion of the holder from the reader for removal thereof.

BRIEF DESCRIPTION OF THE DRAWINGS

The present invention will now be described by way of example with reference to the following drawings in which:

FIG. 3 shows the device of FIGS. 1 and 2 including ejector systems;

FIG. 5 shows a perspective view of a radio communication device in a holder in accordance with a second embodiment of the present invention;

FIGS. 10a and 10b show schematic side and underneath views of the reader of FIGS. 8 and 9;

FIGS. 11a to 11j show a series of configurations of elements of the latch mechanism of the second embodiment.

DETAILED DESCRIPTION OF THE INVENTION

Figure 1:
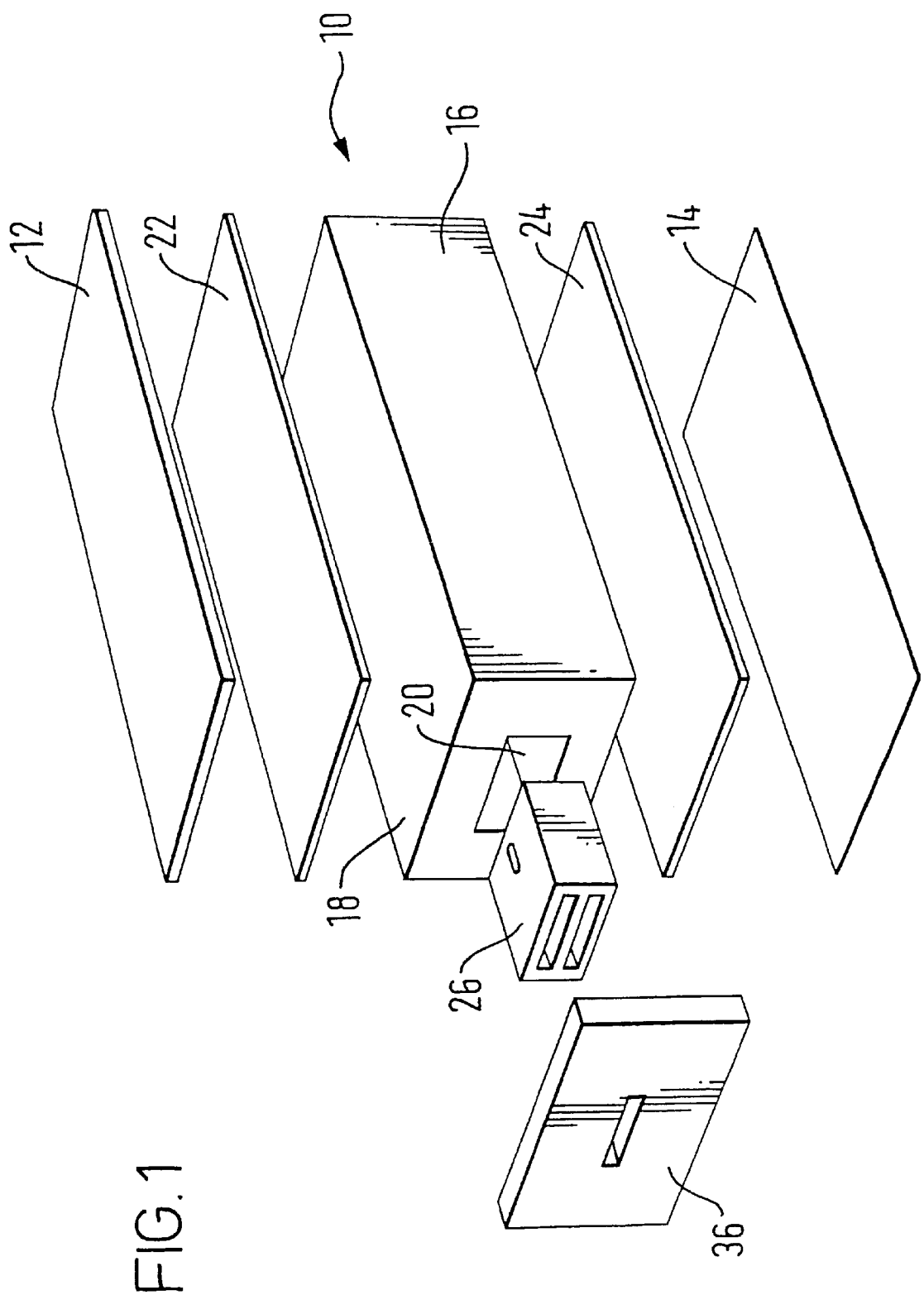
FIG. 1 shows an exploded perspective view of a radio communication device including a holder in accordance with one embodiment of the present invention.

Referring initially to FIG. 1, there is shown a first embodiment of a holder and a radio communication device of the present invention. In this embodiment, the radio communication device is a unit 10 that is mountable for instance in a car or other motor vehicle, and provided in the unit is a data card reader 18.

As is apparent from FIG. 1, the unit 10 is a generally rectangular box shape housing consisting of top and bottom cover plates 12, 14, connected, when assembled, by four rectangularly arranged side walls 16. The unit is provided with the data card reader generally denoted 18. The front wall of the unit has a rectangular aperture 20, which internally leads into the data card reader 18. The data card reader 18 comprises two printed circuit boards 22, 24 for reading inserted data cards. The two printed circuit boards 22, 24 carrying the usual reading electrical circuitry including contacts are arranged substantially parallel in a mutually facing configuration.

Figure 2:
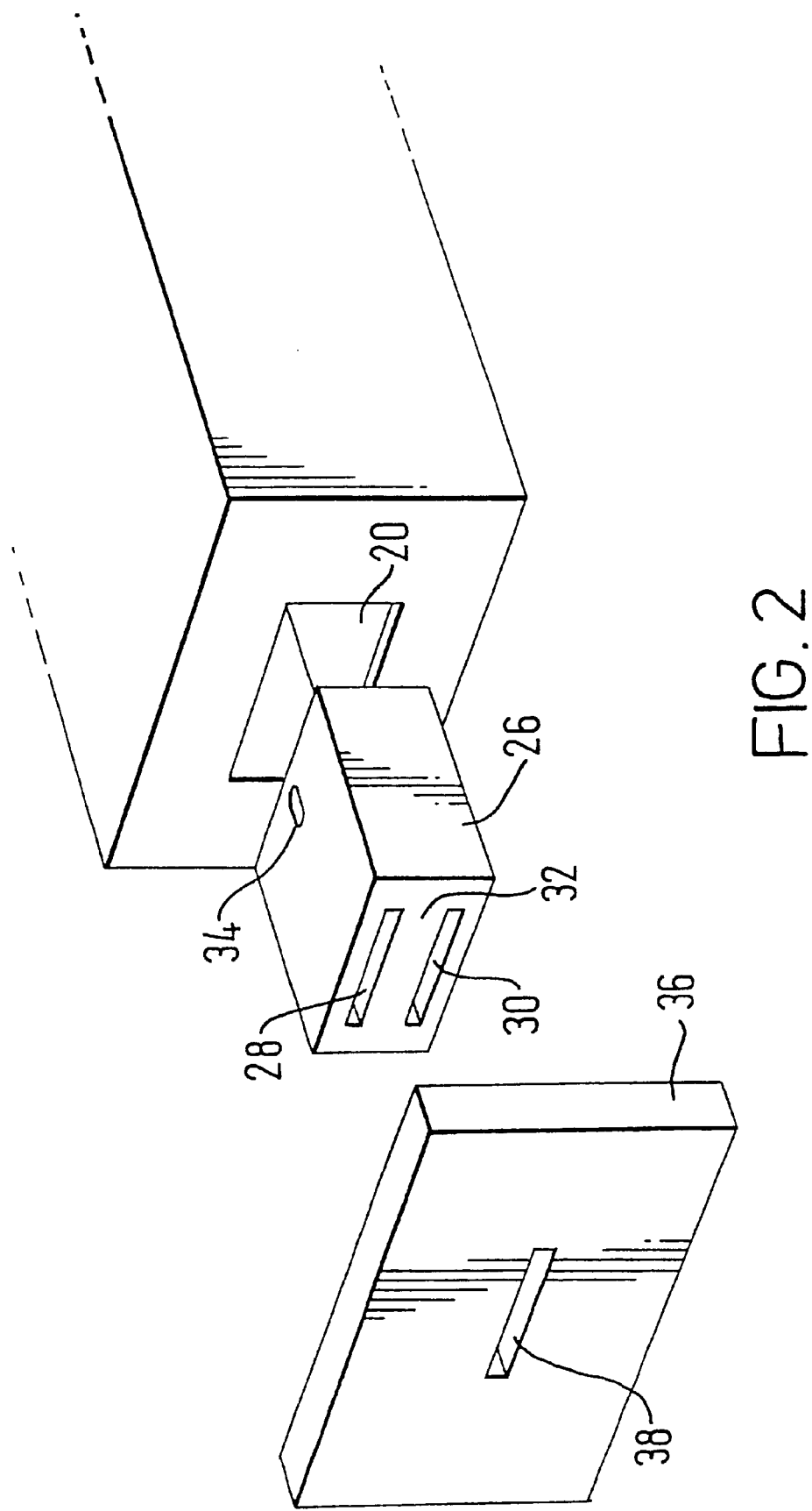
FIG. 2 shows a close-up of the holder of FIG. 1.

Turning to the data card holder 26, which is shown in more detail in FIGS. 2 and 3, it is a generally rectangular cartridge 26 designed to carry two data cards. The cartridge 26 is dimensioned to be inserted into, and removed from, the data reader 18 through the aperture 20 in the unit. As can be seen from FIG. 2, the cartridge 26 is provided with two slotted openings 28, 30 which extend longitudinally into the cartridge 26 thereby providing flat cavities for receiving respective data cards. As shown, the flat cavities are arranged in the cartridge 26 with the plane of their major faces one on top of the other and separated by a separation wall 32. The cartridge 26 is further provided with contact windows 34 in its major faces, each contact window opening into respective flat cavities for receiving respective data cards.

To insert a data card into the holder, it is introduced into one of the slotted openings 28, 30 and then slid further into the flat cavity. Care should be taken to ensure that the data card is inserted such that once in the cartridge, the electrical contact areas of the data card are exposed through the contact window 34. To facilitate this, guide grooves or such like are provided in the cartridge. When the cartridge is loaded with two data cards they are so arranged that their electrical contact areas face oppositely outwards through respective contact windows 34 of the cartridge 26.

Cartridge 26 carrying the two data cards can then be loaded into the data card reader 18 by introducing the cartridge to the aperture 20 in the front wall of the unit 10 and pressing the cartridge through the aperture 20 into the reader.

When the cartridge is inserted into the data reader 18 of the unit 10, the electrical contact areas of the data cards are brought into registration and electrical contact with the electrical contacts of the two facing reader printed circuits boards 22, 24.

Mechanical means for holding the holder in place in the reader may conveniently be provided.

Figure 4A:
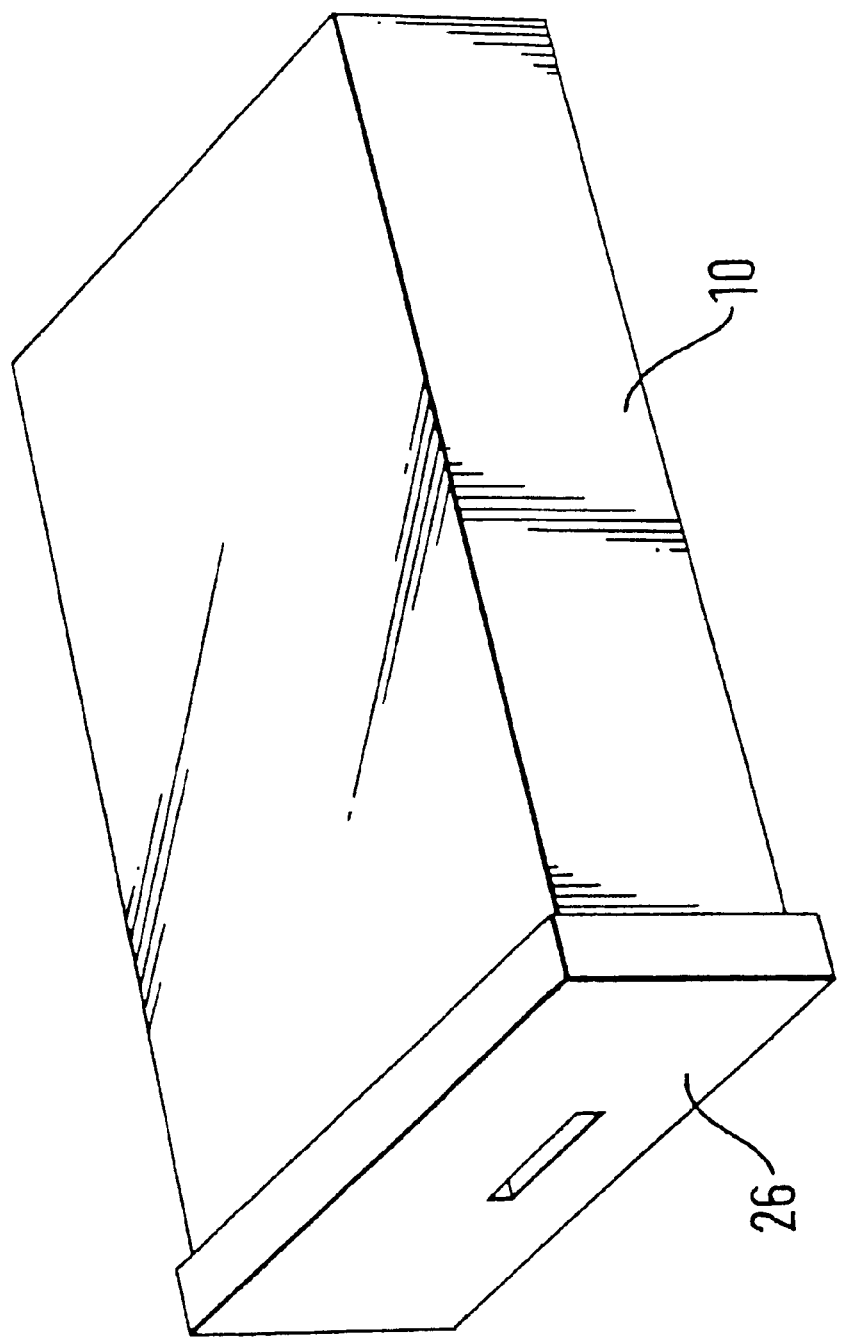
FIGS. 4a and 4b show a radio communication device of the first embodiment in which a cover member is in the first position allowing retraction of a data card.
Figure 4B:
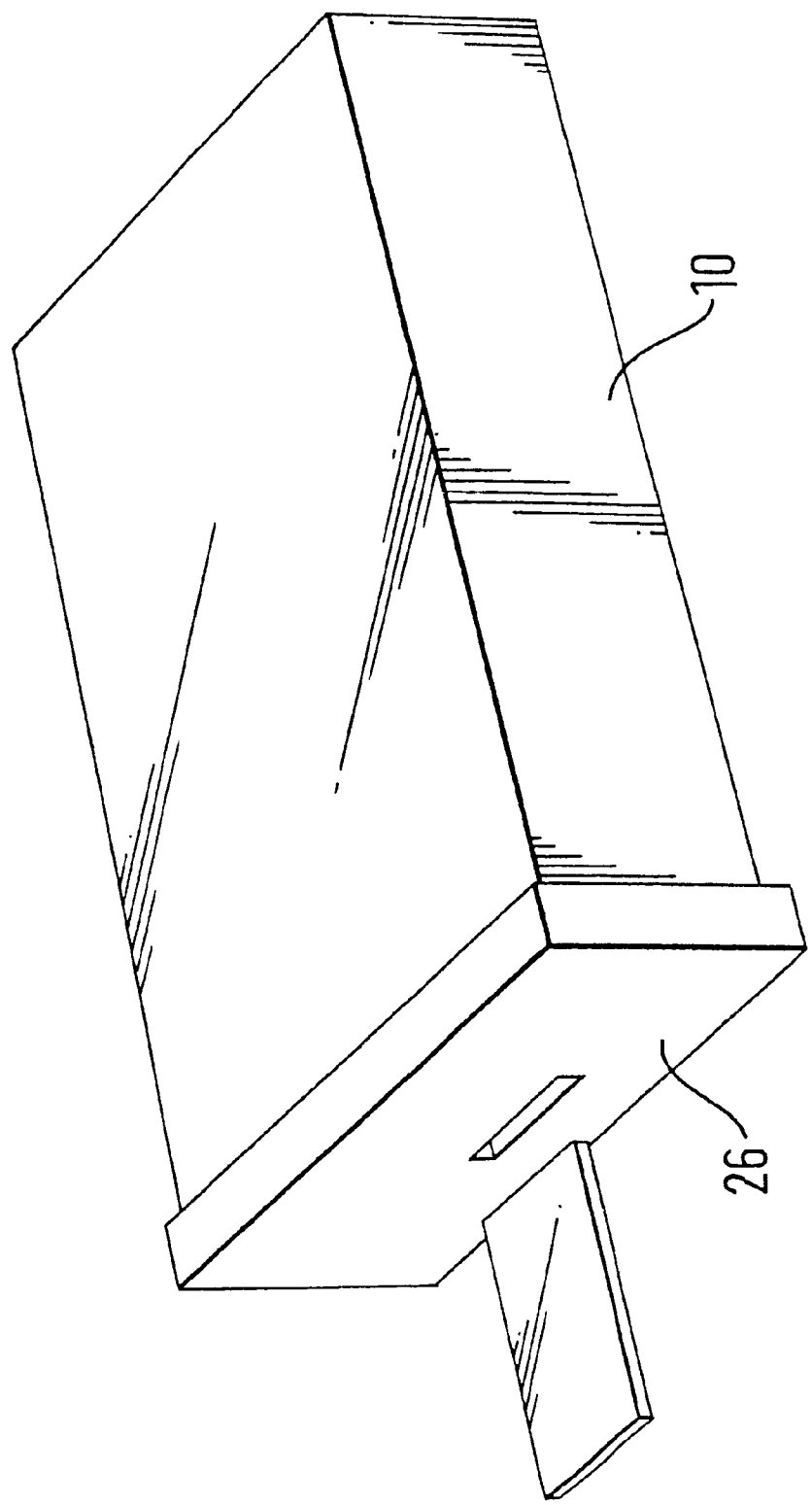

Also shown in FIG. 1 and in more detail in FIG. 2, is a front cover panel 36 associated with the housing of the unit 10. The front panel 36 is adapted to be fixed to the front wall of the unit 10 presenting the data reader aperture 20 by any appropriate mechanical means such as screws or catches or a hinged connection. In the major face of the front panel 36 there is provided a slot 38 and this is positioned so that when a data card holder 26 is present in the data reader the slot 38 is in alignment with one of the slotted apertures 28 of the data holder. In this way, the data card holder 26 can be semi-permanently installed in the data reader and still there would be immediate access to a data card loaded in the reader, as shown in FIGS. 4a and 4b.

It may be that the data card holder is subject to an ejecting force when located in the data reader provided by a convenient ejector means 40 (see FIG. 3). When the front panel is removed the ejector means 40 would push at least a portion of the length of the data card holder out from the aperture 20 of the unit.

The arrangement is such that in an embodiment without an ejector system being associated with the data card reader, the trailing end of the inserted data card projects out from the unit and the slotted aperture of the cover panel 36 so that the user can easily grasp it and pull it out. Alternatively with an ejector mechanism, activation of the mechanism (for instance by pressing a release button) would cause projection of the trailing end of the data card. Release of the cover panel 36 allows access to the other slotted aperture of the holder and data card therein previously blocked. Again either by means of ejector mechanism activation or spring biasing.

A second embodiment of the invention is shown in FIGS. 5 to 11, in which the data card holder is designated 100 and the part of the radio communication unit including the data card reader is designated 200.

Figure 6:
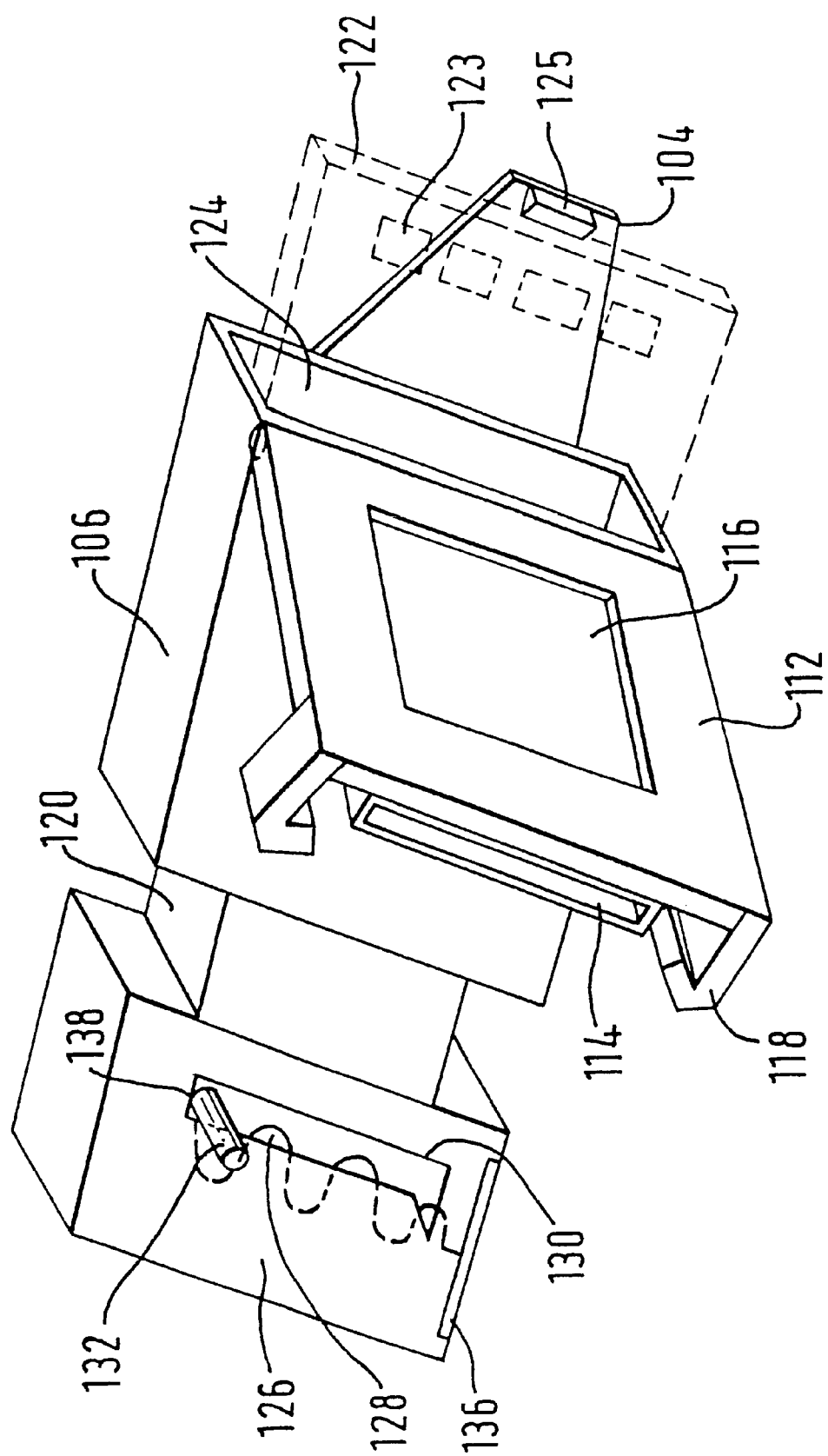
FIG. 6 shows the underside of a holder of FIG. 5.

Referring to FIGS. 5 and 6, in this embodiment, the data card holder 100 is a generally flat rectangularly shaped module being defined by an upper wall 102 extending rearwardly into a cantilever tail portion 104, two side walls 106, 108 depending from the two longitudinal sides of the upper wall 102, and a front wall 110 presenting a front face. For part of its base 111 the data card module 100 has a door 112 depending from and hinged at the rear end of the module so that it hinges open downwardly. A first data card 113, such as the user SIM, can be installed into the module from generally the forward end by inserting it into a sleeve 114 provided in the door 112. The user SIM is inserted so that electrical contacts thereon face downwardly and thus are exposed through a window 116 provided in the lower wall of the door. Extending upwardly from the two opposite side walls of the door 112 are a pair of resilient closure hooks 118 which are designed to cooperate with the complementary recesses 120 provided in the side walls 106, 108 of the module so as to keep the door 112 shut when it is closed. Release of the door 112 to access the user SIM can be effected simply by urging the closure hooks 118 slightly outwards so as to free them from respective recesses 120, thereby allowing the door 112 to be swung open.

As in the previously described first embodiment, the data card holder of the second embodiment is adapted to carry a second data card 122 such as a SMART Card which may be a further memory card. The second data card in this embodiment is inserted from the rear end of the module, and for receiving the second data card the rear end of the module is open, ie there is no wall to the module at this end the upper wall, side walls and the base of the module defining a slot 124 for receiving the second data card. Accordingly, the leading edge of the second data card 122 is inserted into the slot 124 in the rear end of the module and the card 122 is then continued to be slid further into the module. As the body of the second card 122 is being slid into the module the top surface of the card 122 abuts and brushes against a lip 125 which depends from the back end of the tail 104. Due to the top surface of the second card 122 pushing against the lip 125, the tail 104 of the module deflects upwardly slightly owing to its inherent flexibility because of the absence of any surrounding supporting walls. Once the second data card 122 has been fully inserted into the slot, the leading edge thereof being stopped by an internal wall of the module, the trailing edge of the second data card 122 locates against the lip 125 of the tail 104 which accordingly has deflected downwards so as to hold the trailing edge of the second data card 122 securely in position in the module, as shown by the discontinuous lines in FIG. 6. Electrical contact points 123 of the second data card are provided on the exposed portion of the data card and face downwardly.

Disposed at the front end of the module is a compartment 126 defined by the front wall, the upper wall, the two side walls, an internal wall and the base. This compartment houses a sprung peg member 128 that protrudes through a slot 130 in the base. The sprung peg member 128 is illustrated in shadow lines in FIGS. 5 and 6 and more clearly in FIG. 7.

Figure 7:
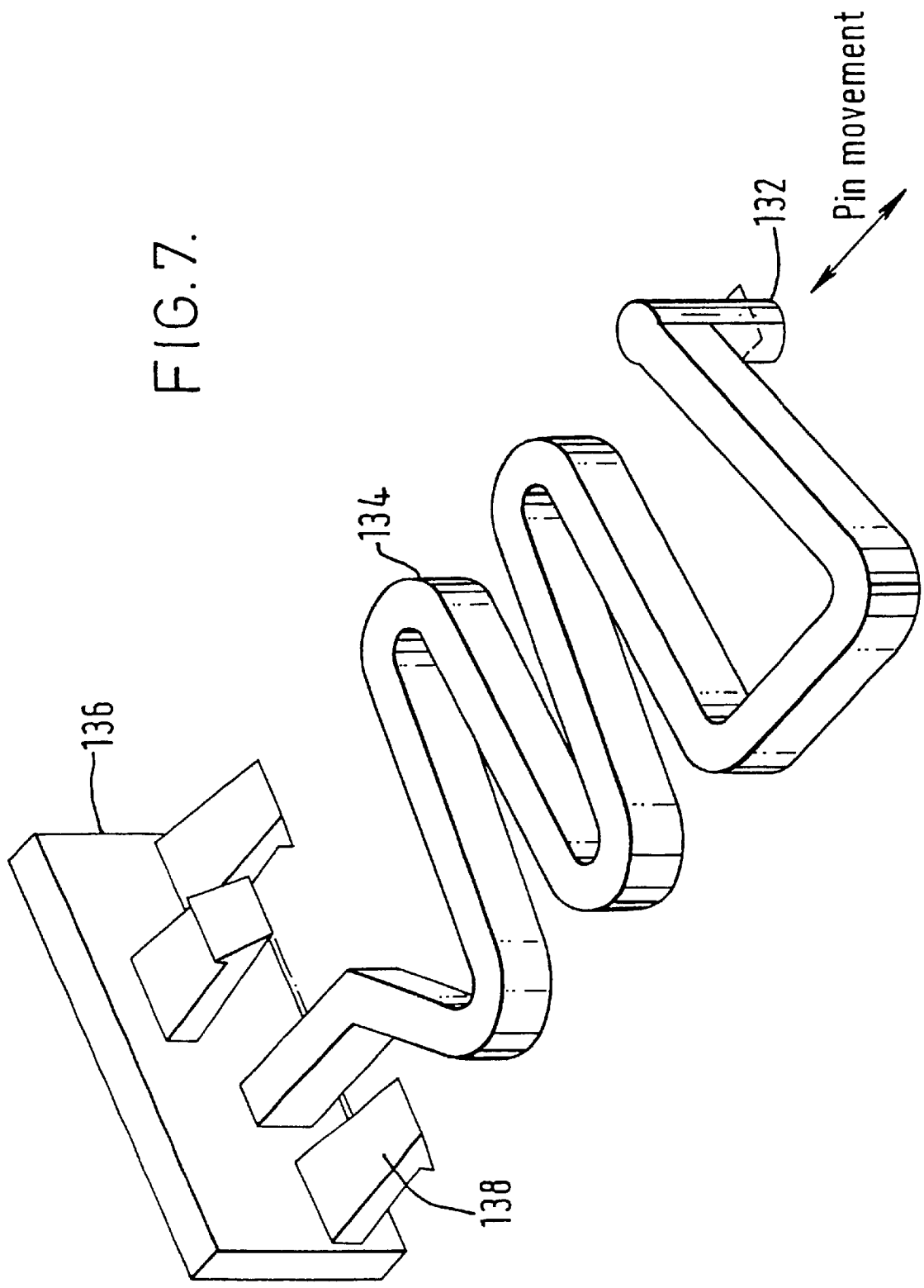
FIG. 7 shows an element of the holder of the second embodiment.

Referring to FIG. 7, the sprung peg member 128 consists of a pin head 132 projecting from and at right angles to the plane of a generally serpentine spring portion 134 that extends from a side wall 136 having connection elements 138 for attaching the side wall 136 with the sprung peg member 128 to the module. Resilience is afforded to the pin head 132 by the serpentine configuration of the spring portion 134. As already mentioned, the pin head 132 protrudes from the slot 130 in the base of the compartment 126, the slot extending transversely to the longitudinal axis of the module. In its normal position the pin head 132 is pressed against the end wall 138 of the slot 130, and is so biased by the spring portion 134 that movement away from the end wall 138 causes the pin head 132 to be urged towards the wall 138. The function of the sprung peg member 128 will become more apparent later.

Figure 8:
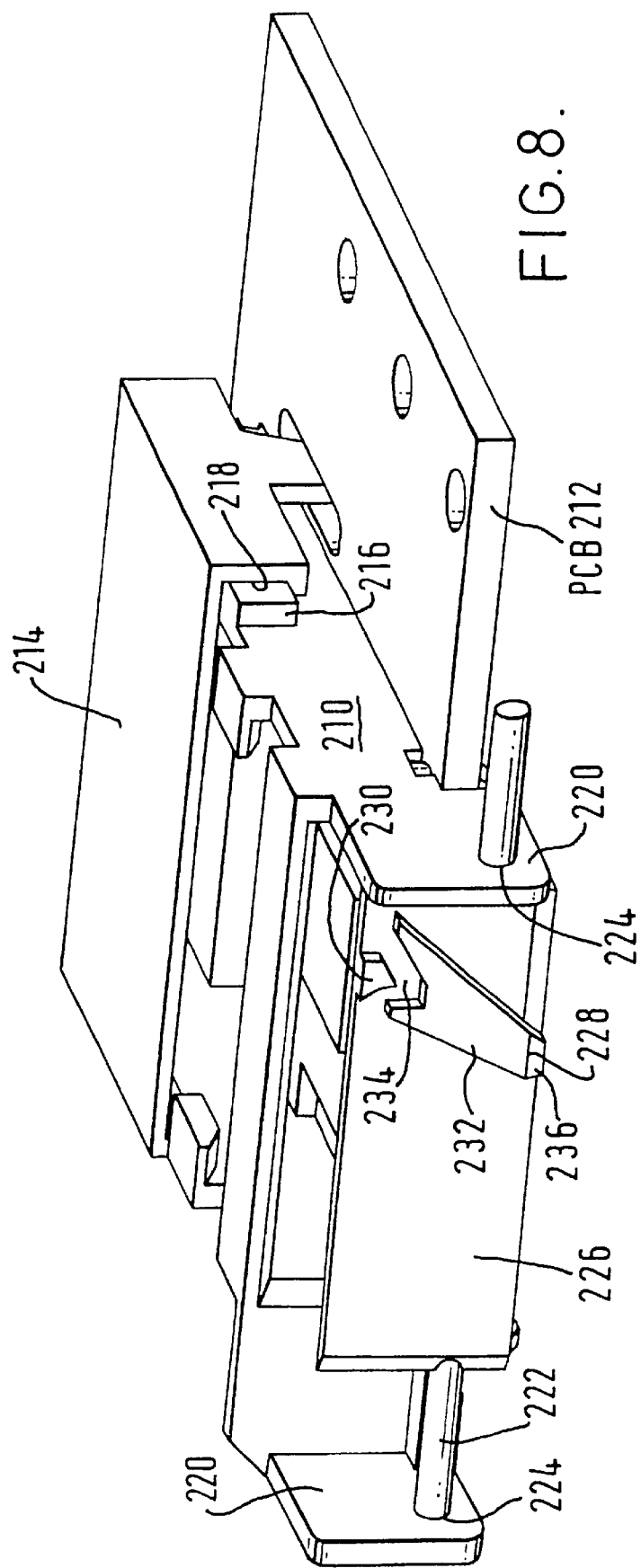
FIGS. 8 and 9 show a data card reader of the second embodiment.

Turning to the data card reader 200, in FIG. 5 the data card reader is shown with an attached fascia plate 202, and in FIG. 8 is shown with the fascia plate removed. The fascia plate 202 provides a slotted aperture 204 for receiving the data card module 100. Further, there is a small cut-out 206 from the bottom edge of the slot 204 for allowing entry of the pin head 132 of the sprung peg member 128 past the fascia 202.

Referring to FIG. 8, the data card reader 200 comprises a frame 210 mounted on a PCB 212. The PCB carries two sets of electrical contacts for registering with respective electrical contacts of the two data cards in the module. The arrangement is such that when the module carrying two data cards is loaded into the reader the electrical contacts of the data cards both face downwardly and come into registration with the upwardly facing electrcial contacts on the PCB. Accordingly, only one PCB is required and the arrangement provides efficient use of space.

Figure 9:
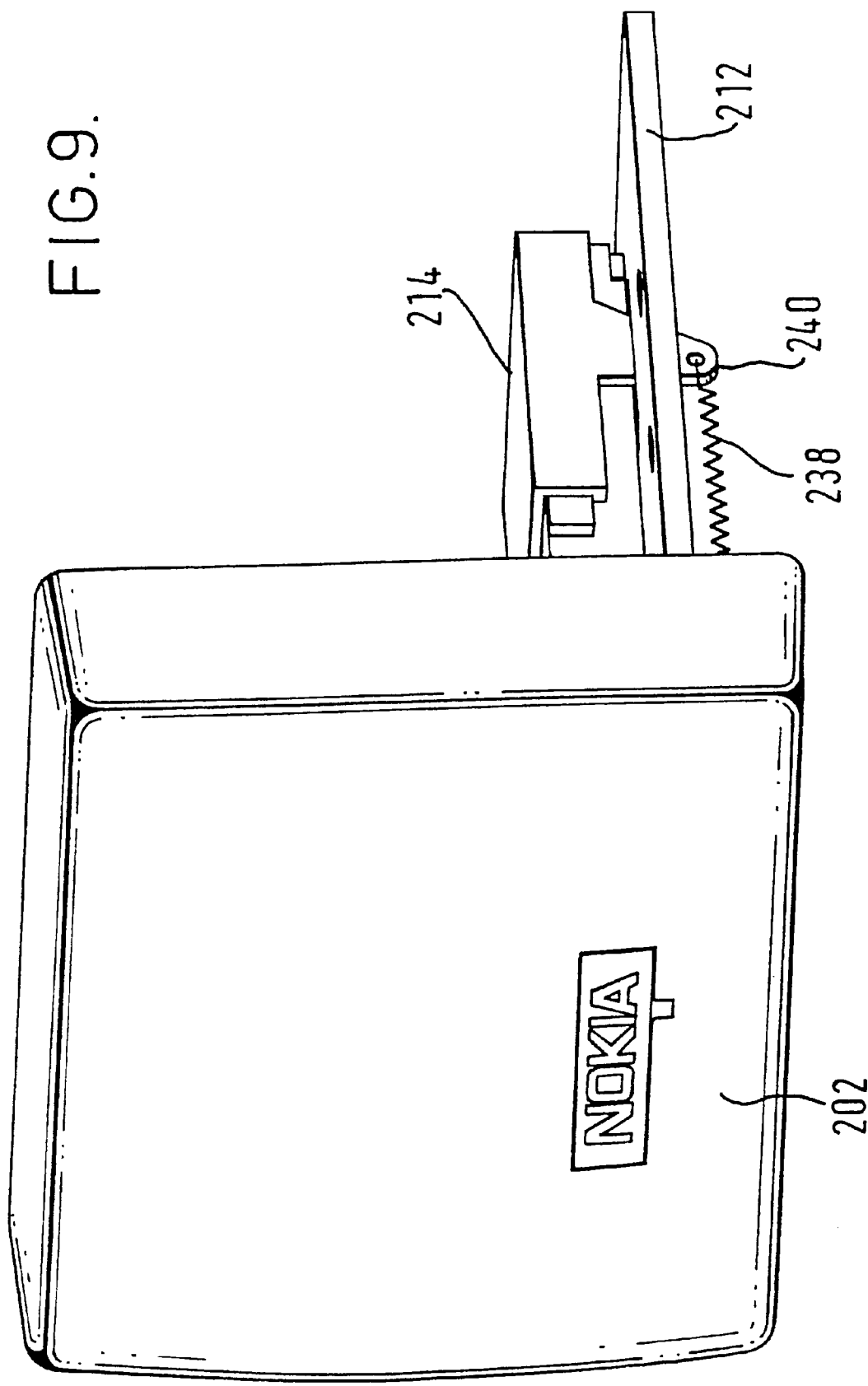

The frame 210 is constructed from wall members consisting of two opposite side walls, a cross bar, back wall and base, so that the frame defines a chamber for receiving the data card module 100. A slider 214 is mounted across the two side walls of the frame and is slidably mounted in relation to the frame on a pair of tracks 216 extending laterally outwards from the frame. These slidingly engage with corresponding channels 218 formed in the side walls of the slider 214. The slider 214 is biased towards the front of the data card reader by a spring 238 (FIG. 9). More details of spring 238 are given below. The undersurface of the slider is provided with a pair of ramps terminating in small feet which are designed to catch the leading edge of the second data card when the data card module is entered into the data card reader. The ramps serve to gradually push down on the second data card so that its electrical contacts make a good contact with the corresponding contacts on the PCB.

Extending forwardly from the front of the frame are a pair of oppositely facing arms 220. Spanning the two arms 220 is a shaft 222 which is journalled in circular holes 224 provided in the lower portions of the arms 220. The journalling of the shaft 222 with respect to the circular holes 224 is such that the shaft can rotate about its axis, and furthermore can slide laterally in the holes 224 from side to side. Rigidly fixed to the shaft 222 and extending a major part of the length thereof is a flap 226 which is therefore also able to rotate with the shaft 222 about its axis and move laterally with it. To the right side of the front face of the flap 226 there is provided a relief pattern 228. The relief pattern 228 is a formation which projects outwards from the face of the flap 226, and the front face of the relief pattern 228 is in a plane substantially parallel to that of the front face of the flap 226.

The relief pattern 228 consists of an upper raised formation 230 in the form of a lug, and a lower raised formation 232 in the form of a substantially 'V' shaped wedge. Defined between the upper and lower raised formations is a guideway 234. The two sides of the lower raised formation taper decreasingly downwards, with the right side having a greater degree of inclination than the left side. Just at its bottom edge, the lower raised formation is bevelled inwardly 236. The function of the relief pattern will be described later.

In FIG. 8 the flap 226 is shown as being disposed in the vertical plane and is resiliently biased about the shaft axis so that unless deflected it always takes up a vertical orientation. The flap 226 whilst being able to slide from side to side in holes 224 is also resiliently biased laterally towards the right side in FIG. 8 such that the right vertical side wall of the flap abuts the right arm of the frame of the data card reader. The rotational resilient bias and the lateral resilient bias can be provided by one or more springs. However in the preferred form of this embodiment these two biases together with the forward bias on the side 214 are exerted by one and the same spring, that is spring 238.

FIGS. 10a and 10b show the spring 238 in side and underneath plan views respectively. The spring 238 is stretched between a fin 240 depending down from the right side wall of the slider 214 and a foot 242 extending out from the back of the left edge of the flap 226. The fin 240 extends through a slot in the PCB along which it can move. Accordingly, the spring is connected in an oblique fashion so that it urges the slider towards the front of the reader, so that it also urges the flap to the right hand side, and so that it also imparts a rotational bias torque to the flap to keep in normally in the vertical position. Thus it should be apparent that the spring exerts a plurality component forces, which obviates the need for a series of springs thus providing savings in component count.

The design of the data card module and the data card reader is such that in order to install the module in the reader the module is simply pressed into the slotted aperture of the reader and once inside the reader, the module automatically locks into position in the reader. For releasing the module it is simply pressed once again into the reader which automatically unlocks the module from the reader so as to allow the withdrawal of the module. The details of this operation are as follows.

Details of installing the module in the reader will be described first. With two data cards loaded into the data card holder module, the data card module is offered up to the slotted aperture 204 in the fascia plate 202 of the data card reader. It is offered up to the aperture 204 with the rear end of the tail portion 104 of the module as the leading edge. Accordingly, the tail portion 104 is inserted into the aperture 204 and the front face 110 is pressed inwards. As the tail 104 passes the opening of the slotted aperture 204 it comes into contact with the flap 226 near to its top edge midway along the length of the flap. This applies a turning force to the flap which as a result rotates about the shaft axis from its vertical configuration towards a horizontal configuration, and as the module is pushed in further the flap adopts a horizontal planar orientation against the rotational bias of the spring 238 which acts to hold the flap in a vertical plane.

The module is continued to be inserted inside the reader and once the tail 104 is past the slotted aperture, the side walls 106, 108 of the module slide against and effectively come to be guided first by the end walls of the slotted aperture 204, and on further insertion by the side walls and cross bar of the frame 210 of the data reader, which thus receives the module. This engagement between respective walls of the module and reader frame serves to constrain the module to be able to move with only one degree of freedom in relation to the reader, that is sliding in a longitudinal direction in and out of the slotted aperture 204.

As the module is further pressed into the reader the leading edge of the second data card catches the depending feet on the under surface of the slider 214, and as the module is pressed in further the second data card pushing on these feet moves the slider 214 backwards. Backwards displacement of the slider stretches the spring 238 which consequently imparts a forward acting force on the slider, which in turn pushes on the module via the feet and data card leading edge so as to tend to urge the module back out of the slotted aperture 204 against the direction of insertion.

Once approximately two thirds of the length of the module has been fed into the reader, the sprung peg member 128 approaches the slotted aperture 204 and pin head 128 passes through the cut-out 206 in the slotted aperture. On continued insertion past the slotted aperture the pin head 132 of peg member 128 comes into contact with the bottom right hand corner of the now horizontally orientated lower raised formation 232.

Figure 11C:
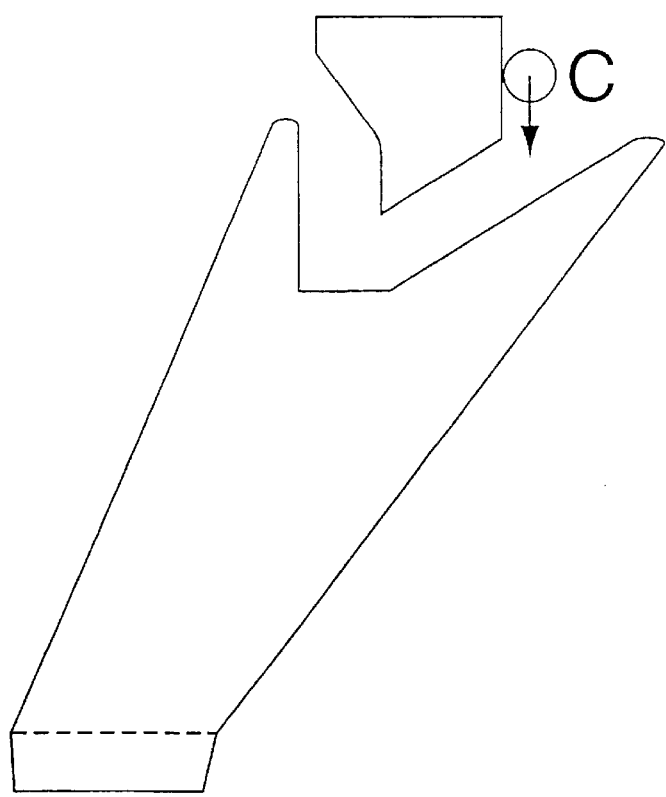
Figure 11D:
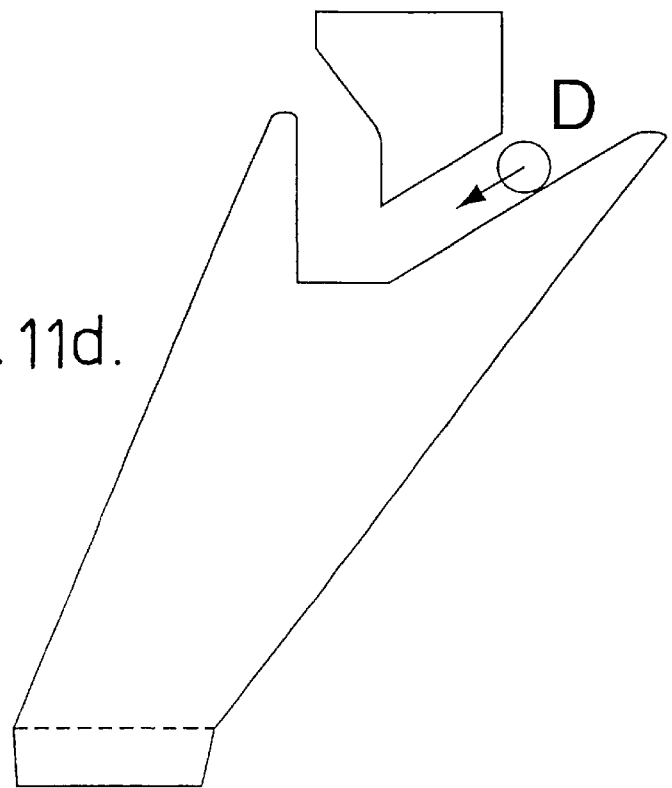
Figure 11E:
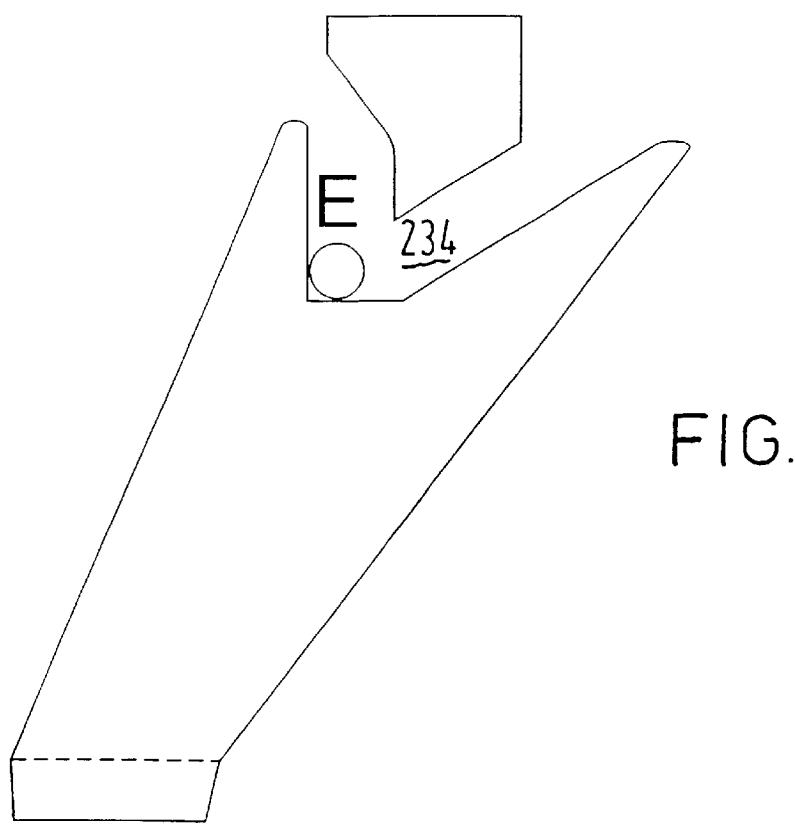
Figure 11F:
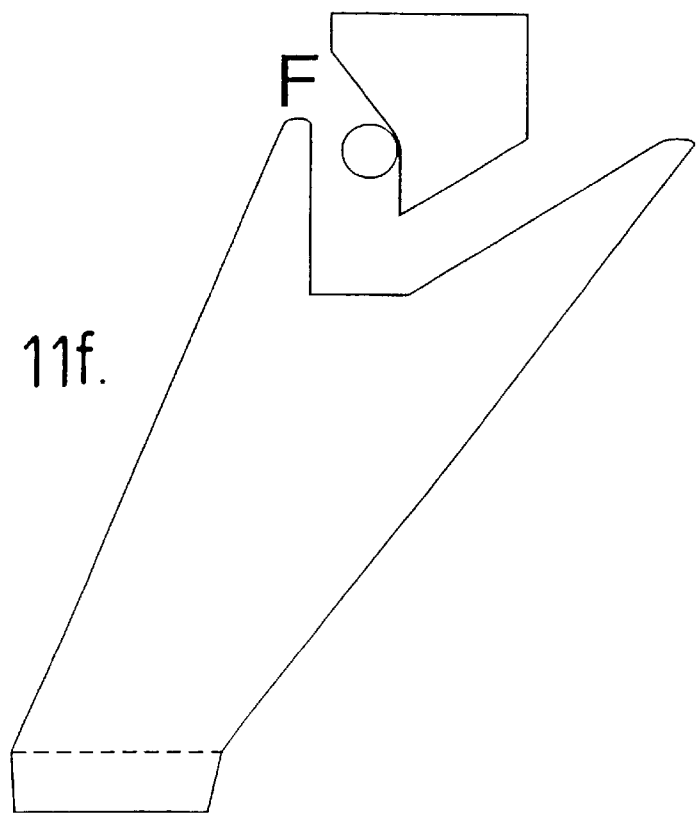
Figure 11G:
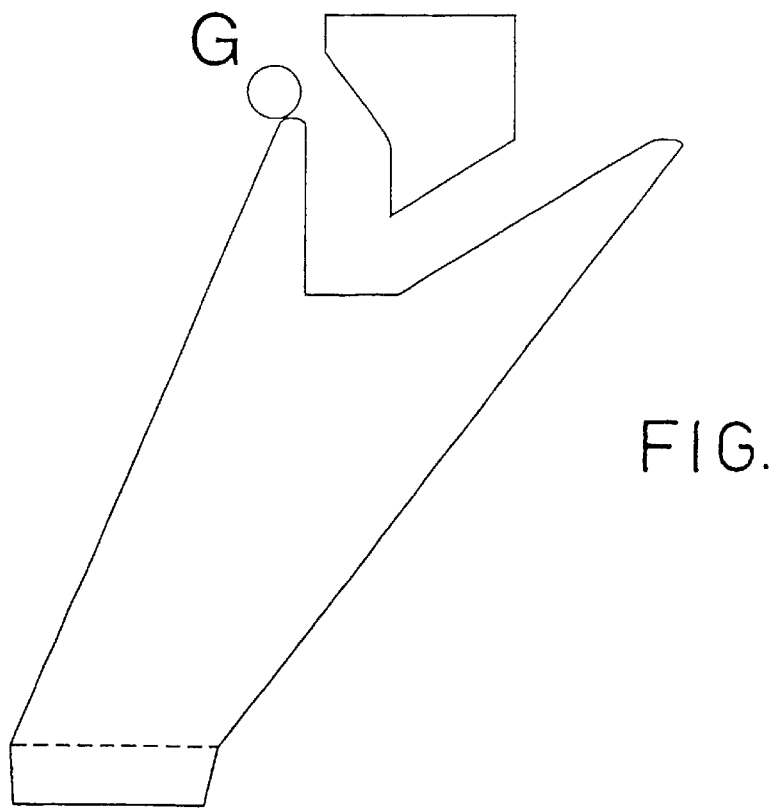
Figure 11H:
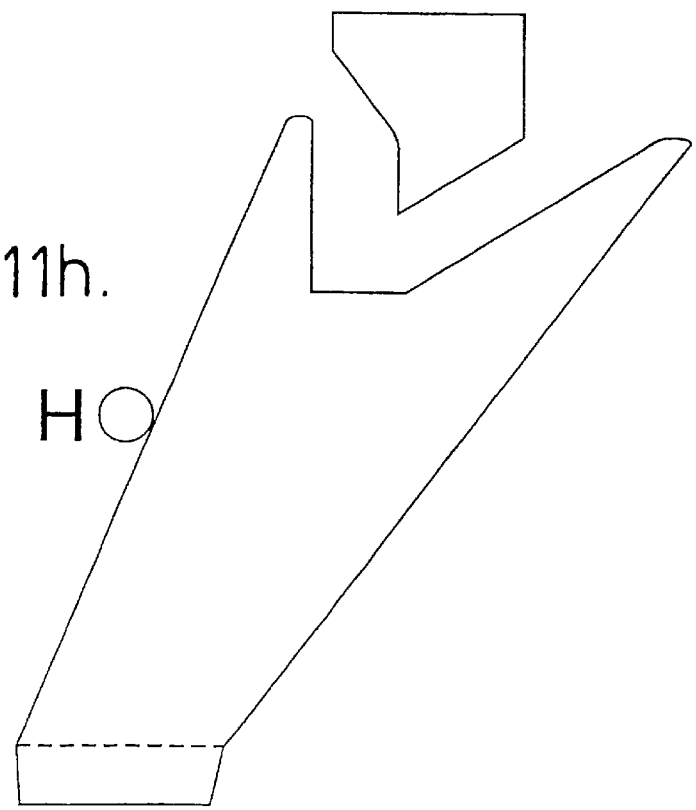
Figure 11I:
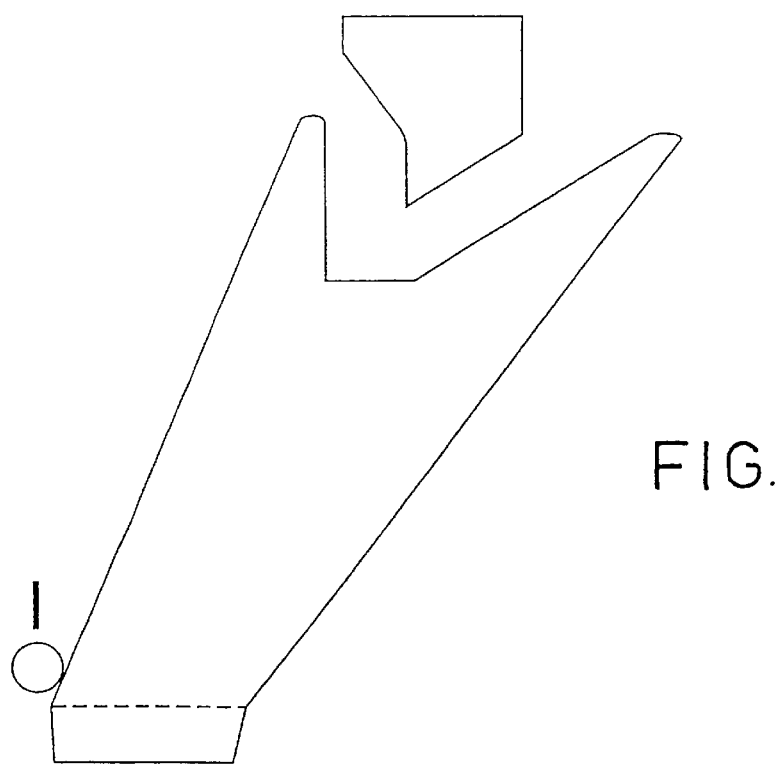
Figure 11J:
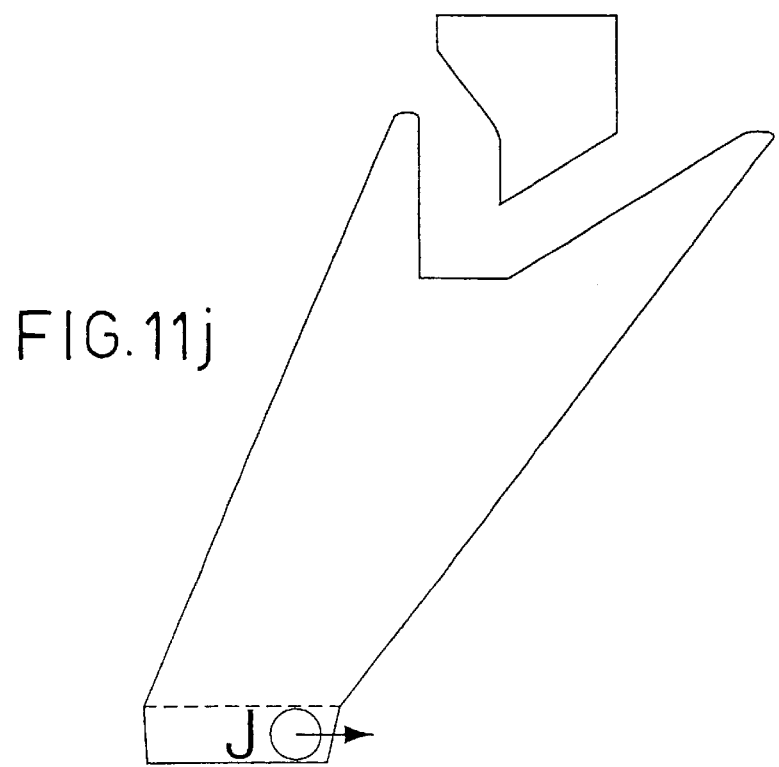

This is the start point of the pin head's journey around the contour of the relief pattern as illustrated in FIGS. 11a to 11j. In FIG. 11a the start point is indicated at position A. It should be borne in mind that the pin head 132 is biased against the end wall 138 of the slot 130 in the base of the module by the spring portion 134, and can move against the bias of the spring 134 in the slot. Furthermore, the flap is resiliently biased by spring 238 so as to be urged laterally towards the right but can slide from side to side against the action of the lateral resilient bias so that the shaft slides in the holes of the extending arms of the frame.

From position A, as the data card module is pushed in into the reader, the pin head 132 moves inwards into the reader and pushes against the side of the inclined right hand surface of the lower raised formation. Because the pin head is hard against the end 138 of the slot it cannot move to the right and thus the action of moving the pin inwards translates to displacement to the left of the flap. In other words, the pin displaces the flap to the left by a wedging action on the inclined hand surface of the lower raised formation against the lateral spring bias. As the module is pushed further inwards into the reader, the pin which of course is also moving inwards continues to push against the right side of the lower raised formation and because of the extending inclination of the lower raised formation the pin carries on acting on the formation to move the formation and consequently the flap towards the left hand side.

During this inward movement of the module, the leading edge of the second data card which has engaged the depending feet of the slider pushes the slider further backwards thereby further stretching the spring which consequently exerts a forward pushing force on the slider and the module.

As the module is pressed in some more against the pushing force of the slider, the pin head continues to push on the inclined right side surface of the lower formation, pushing the flap to the left until the pin head reaches the position marked B in the FIG. 11*b* which in relation to the formation is the upper right position. In this position, the flap has been displaced to the left by the amount indicated as delta in FIGS. 11*a* and 11*b*. Because the flap has moved to the left, the spring which is connected to the flap has been stretched to the left and so applies a bias to the flap to pull it back towards the right. From B, as the module is pushed further in, the pin head clears the crest of the right side surface of the formation. At this juncture, because of the lateral resilient bias of the spring pulling the flap towards the right, the spring snaps the flap towards the right so that the pin head abuts and stops against the upper raised formation in the position shown at C: it abuts against the right hand side of the upper raised formation and prevents the flap from total movement to the right. At this point the data card module is fully inserted inside the data card reader and the front face of the module is flush with the face of the fascia plate. Accordingly, insertion of the modules ceases. Consequently, the slider 214 which is resiliently biased to push the module back outwards pushes the module accordingly which moves the pin head down along the right side face of the upper raised formation to position D in FIG. 11*d*. At this point, the pin head is moved along the inclined right side face of the upper raised formation by the action of the lateral resilient bias of the spring continuing to pull the flap across to the right. The pin head is also moved towards the trough of the V shaped notch in the lower raised formation by action of the slider pushing outwards on the module. As a result, the pin head is moved along guideway 234 and comes to stop in the catch member given by the right angle detent defined by the left side wall of the substantially V shaped notch in the upper surface of the lower raised formation at position E in FIG. 11*e*. In this position, the pin head is latched with respect to the relief pattern and consequently the module is securely held in the reader. This latching is provided by virtue in one direction of the pushing action of the slider on the module thus urging the pin against the base of the V shaped notch of the lower raised formation which is held firm in that direction by being part of the flap which is fixed in that direction by the arms of the frame of the reader. And in the other direction by virtue of the pin head being pushed by the left side wall (because of the lateral spring bias) against the end wall 138 of the slot 130 in the module. Accordingly, the module is installed in the reader.

To uninstall the module and release it from the reader, the operation is as follows.

The front face 110 of the module is once again pressed in towards the data card reader. This dislodges the pin head from the right angle detent of the V shaped notch to position F and onwards in guideway 234 such that it approaches the crest of the left wall. At this point, the flap which is still biased to some extent to the right now has the opportunity to move across to the right once more and accordingly the pin head clears the left side wall and proceeds to position G.

In this configuration, the flap has moved back to the right so that its right side wall is hard against the right arm 220 of the frame of the reader.

With the pin head clear of the guideway 234, the slider which is urging the module outwards pushes on the module by means of the longitudinal bias of the spring. This pushes the module outwards to some extent. The effect of this on the pin head is that the pin head moves sideways towards the left along the left hand side of the lower raised formation. The pin head is able to move sideways towards the left because it can move to the left in the slot 130 in the module from which it projects against the bias of its spring portion 134. As the module is withdrawn from the reader it slides down the inclined left hand surface of the lower raised formation, itself moving to the left against spring bias 134 as it does so, and in FIG. 11*h*. As it approaches the lower part of the left inclined wall (FIG. 11*i*) the resilience of the spring portion 134 pushes the pin head towards the right back over the bevel 236 towards its start position hard against the end wall 138 of the slot 130. The module is thus retracted from the reader.

Accordingly, it should be apparent that the pin head is made to follow the contour of the relief pattern because while the pin head reciprocates longitudinally, the flap moves transversely from side to side. Thus in a general sense the latching mechanism allows the data card module to be pressed into the reader for connection and then again for disconnection by the provision of resiliently biased interengaging formations.

It is envisaged that one of the data cards will be the user SIM card and the other data card could be a Smart card or a further SIM card having stored thereon the phone numbers of the Emergency Services in various countries. In this way, if the car is driven around in different countries, something that is very probable for example in central Europe, then the user does not have to commit to memory the different Emergency Services' telephone numbers. It should be mentioned that the user SIM need not be installed in the unit in order for the Emergency SIM card to be operational.

Accordingly, if the Emergency SIM requires replacement because say the Service Provider is changed, or needs testing, or the car has a new owner, it can be quickly and conveniently removed from the radio device unit and then drawing out the data card holder and finally removing the SIM. Since this operation can be performed by the user it does not require a specialist Serviceperson. Nor does it mean that the radio device has to be opened up, thus minimising the risk of damaging the radio device.

The unit itself may be a telematic terminal operating in GSM with some Value Added Services for example security and traffic information services using the double SIM card concept (user SIM and back-up SIM). The telematic terminal is normally mounted (fixed) in the car. The set up is envisaged such that there are no limitations for the first SIM, the User SIM. The second SIM, so called back-up, should not be prepaid, fixed dial or twin-card. In this context, an easily removable User SIM would carry out the every day phone usage. The back-up SIM (also called as Fixed SIM), would be a secondary, limited usage SIM to carry out some Value Added Service functions.

The telematic unit uses GSM communications and GPS data to implement Value Added Services for different purposes. Some of them like traffic information are terminal independent and some of them are highly dependent on existing car interfaces like automatic emergency call (airbag signal triggered), theft protection service (theft alarm triggered) etc.

The basis of the double SIM concept is to back-up the User SIM in emergency situations since it is not always assured that the User SIM is inserted, can support the functionality, or is not blocked etc. It is envisaged to have two SIMs active at the same time (receiving, paging). The present invention may be embodied in other specific forms without departing from its essential attributes. For example, the radio communication device could be a portable hand-held radiotelephone. The particular design of the mechanical formations provided for holding the two data cards could take a number of different arrangements for example, grooves, channels or flanged lips could be provided for receiving the data cards. Additionally, the elements of the latching mechanism of the second embodiment may be mechanically reversed.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

Accordingly, reference should be made to the appended claims and other general statements herein rather than to the foregoing description as indicating the scope of invention.

The abstract as filed herewith is included herein by reference.

What is claimed is:

1. A data card holder for two or more data cards for a radio communication device having a data card reader, the holder comprising a body having formations for releasably carrying said two or more data cards, and installed by a user into the data card reader and removed from said reader by the user such that said data card holder can be detached from said reader so as to be remote from said reader and said device, and wherein the body includes respective apertures for exposing electrical contacts of said data cards when loaded in the body.

2. A holder according to claim 1, wherein said formations are provided such that the two or more data cards when loaded in the body are carried in an oppositely facing back to back arrangement.

3. A holder according to claim 1, wherein said formations comprise longitudinally extending slots for receiving said two or more data cards.

4. A radio communication device including a data card reader, the device having a housing defining an aperture associated with the reader and dimensioned to receive a data card holder carrying two or more data cards, such that the data card holder is insertable into the reader by a user and removable from the reader by a user such that the data card holder can be detached from the reader so as to be remote from the reader and the device, and wherein the data card holder is provided with formations for releasably carrying two or more data cards, the radio communication device further comprising a cover member adapted to be disposed against said housing such that when a data card holder is located in the card reader the cover obstructs retraction of at least one of the two or more data cards.

5. A radio communication device according to claim 4, wherein the data card holder carries said two or more data cards in an oppositely facing arrangement, and the data card reader comprises two or more electrical circuits correspondingly arranged in facing relationship for reading the two or more data cards.

6. A radio communication device according to claim 4, wherein the data card holder is provided with longitudinally extending slots for receiving said two or more data cards, and the cover member is provided with one or more slots which when the cover member is disposed against said housing are in alignment with one or more of the openings of the longitudinally extending slots of the data card holder.

7. A radio communication device according to claim 4, comprising ejector means urging the installed data card holder such that on removal of the cover member at least a portion of the data card holder is urged through the aperture.

8. A radio communication device including a data card reader, the device having a housing defining an aperture associated with the reader and dimensioned to receive a data card holder carrying two or more data cards, such that the data card holder is insertable into the reader by a user and removable from the reader by a user such that the data card holder can be detached from the reader so as to be remote from the reader and the device, and wherein the data card holder is provided with formations for releasable carrying two or more data cards, wherein the data card reader and a data card holder have a latching mechanism therebetween for releasably connecting together the holder and the reader, the holder having a longitudinal axis indicating a longitudinal direction and received in the reader, and the latching mechanism being engagable in the latched condition to connect together the holder and reader by pressing the holder in the longitudinal direction into the reader, and being disengagable from the latched condition to release the holder and reader by pressing the holder into the reader in the longitudinal direction, the latching mechanism comprising a lateral deflecting surface and detent associated with one or other of the holder or reader, the lateral deflecting surface being inclined to the longitudinal direction, a peg member associated with the other of the holder or reader, and resilient means operative to apply bias in the longitudinal direction and in a transverse direction to the longitudinal direction, in which the longitudinal bias of the resilient means acts so as to urge the holder and reader longitudinally apart, and the transverse bias of the resilient means acts so as to urge one of said lateral deflecting surface and detent or said peg member transversely with respect to the other one of the lateral deflecting surface and detent or the peg member, the arrangement being such that responsive to pressing the holder into the reader for connection, the lateral deflecting surface, peg member and resilient means cooperate so as to engage the peg member with the detent in the latched condition, and responsive to pressing the holder into the reader for release, the peg member disengages from the detent and the resilient means operates to urge at least a portion of the holder from the reader for removal thereof.

9. A radio communication device according to claim 8, wherein the arrangement is that for connection of the holder and reader the holder is inserted into the reader causing the lateral deflecting surface to abut the peg member and whereby responsive to continued insertion the peg member and the lateral deflecting surface co-operate to cause transverse deflection of one of said lateral deflecting surface and detent or said peg member against the transverse bias of the resilient means, and continued insertion causes the peg member and the lateral deflecting surface to clear one another so as thereby to allow the resilient means to bias and hold the peg member into engagement with the detent in the latched position by means of the longitudinal and transverse bias thereof, and wherein for releasing the holder from the reader the holder is urged towards the reader in the longitudinal direction against the longitudinal bias of the resilient means so as to disengage the peg member from the detent thereby allowing the transverse bias of the resilient means to urge one of said lateral deflecting surface and catch member or said peg member in a transverse direction such that the peg member is clear of the catch member so that the first resilient means can urge the holder apart from the reader for removal of the holder from the reader.

10. A radio communication device according to claim 8, wherein the lateral deflecting surface and detent are incorporated in a relief pattern associated with the reader, and the peg member is associated with the holder.

11. A radio communication device according to claim 1, wherein said at least one data card is mounted from the rear of the holder.

12. A radio communication device according to claim 8, wherein the data card reader defines a chamber for receiving the holder and includes a slider adapted to be engaged with the holder so as to resiliently bias the holder out of the card reader.

13. A radio communication device according to claim 8, wherein the data card holder has a backwardly extending cantilever tail portion.

14. A radio communication device according to claim 8, wherein disposed towards the front of the holder is a compartment carrying a sprung peg which depends from a slot in the base of the compartment wherein said peg is resiliently biased in said slot towards an end wall of the slot.

15. A radio communication device according to claim 10, wherein the transverse bias of the resilient means acts so as to urge the relief pattern transversely with respect to the peg member.

16. A radio communication device according to claim 10, wherein the relief pattern is provided on a flap.

17. A radio communication device according to claim 16, wherein a spring disposed between the slider and the flap provide the resilient means.

* * * * *

UNITED STATES PATENT AND TRADEMARK OFFICE
CERTIFICATE OF CORRECTION

PATENT NO. : 6,705,529 B1
DATED : March 16, 2004
INVENTOR(S) : M. Kettunen et al.

It is certified that error appears in the above-identified patent and that said Letters Patent is hereby corrected as shown below:

Column 12,
Line 19, "releasable" should be -- releaseably --

Column 13,
Line 20, "claim 1" should be -- claim 13 --

Signed and Sealed this

Twenty-eighth Day of September, 2004

JON W. DUDAS
*Director of the United States Patent and Trademark Office*